Figure 1:
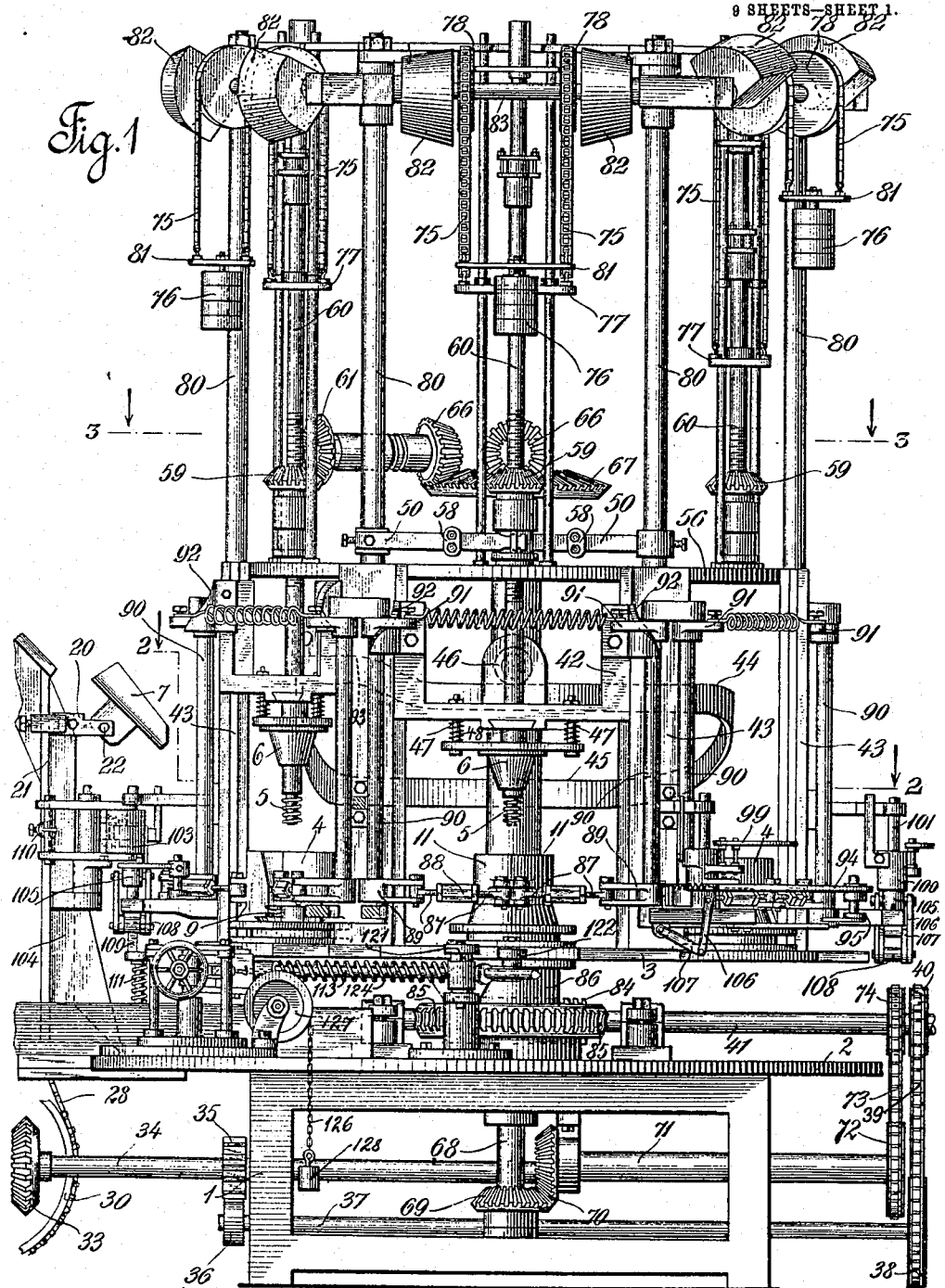

No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.
9 SHEETS—SHEET 1.

WITNESSES:
F. N. Roehrich
John Prager

INVENTOR
Seraphin Kribs
BY his ATTORNEYS
Kenyon & Kenyon

No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.

9 SHEETS—SHEET 3.

WITNESSES:
F. N. Roehrich
John Prager

INVENTOR
Seraphin Kribs
BY his ATTORNEYS
Kenyon & Kenyon

No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.

9 SHEETS—SHEET 4.

Fig: 4

WITNESSES:
F. N. Roehrich
John Prager

INVENTOR
Seraphin Kribs
BY his ATTORNEYS
Kenyon & Kenyon

No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.

9 SHEETS—SHEET 5.

WITNESSES:
F. N. Roehrich
John Prager

INVENTOR
Seraphin Kribs
BY ATTORNEYS
Kenyon & Kenyon

No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.

9 SHEETS—SHEET 6.

Fig. 6

WITNESSES:
F. N. Roehrich
John Prager

INVENTOR
Seraphin Kribs
BY his ATTORNEYS
Kenyon & Kenyon

No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.
9 SHEETS—SHEET 7.
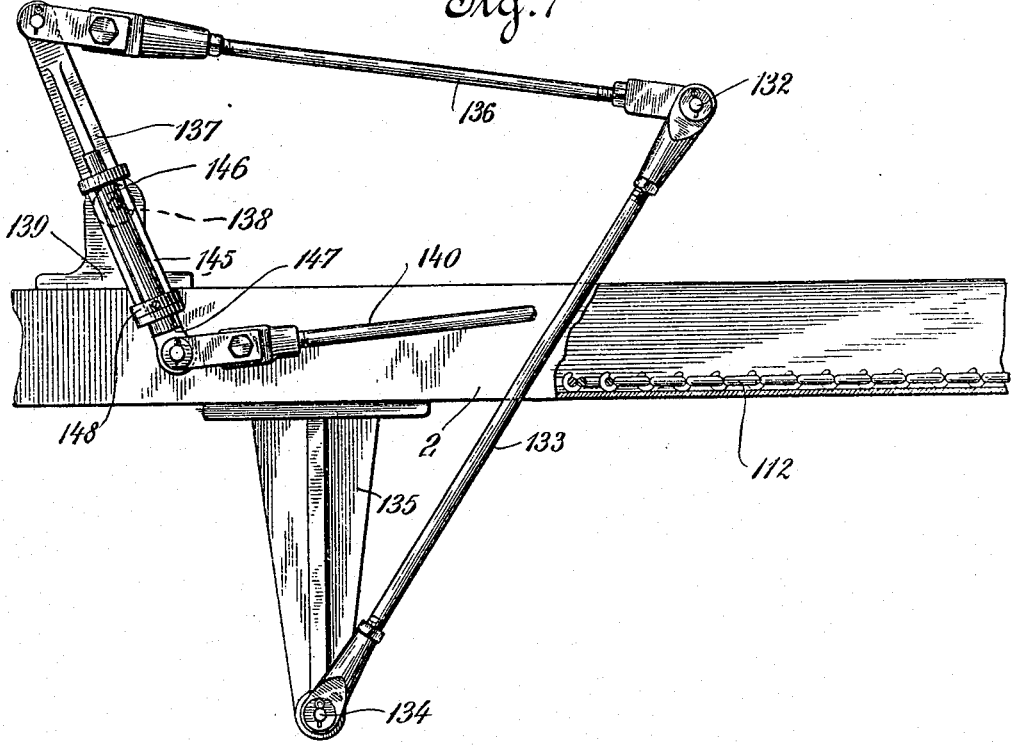
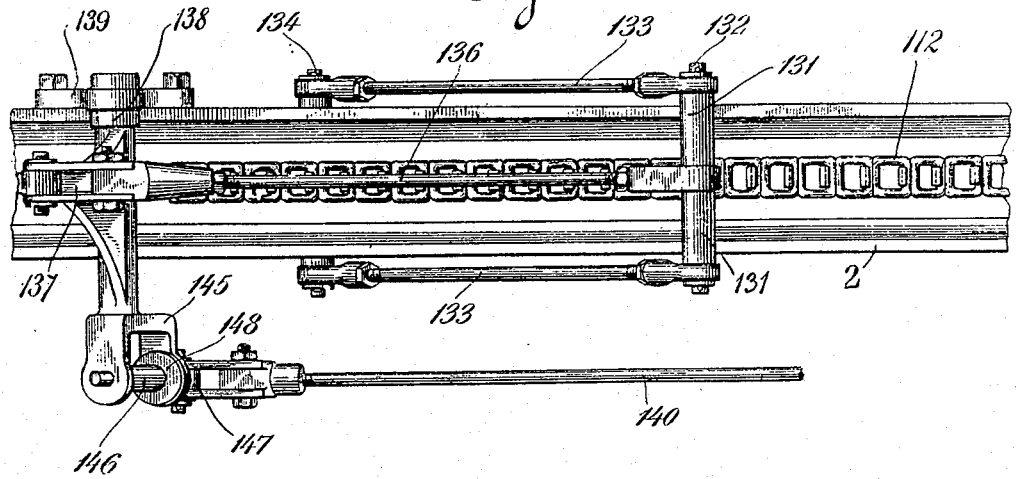
WITNESSES:
F. N. Roehrich
John Prager
INVENTOR
Seraphin Kribs
BY his ATTORNEYS
Kenyon & Kenyon No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.
9 SHEETS—SHEET 8.
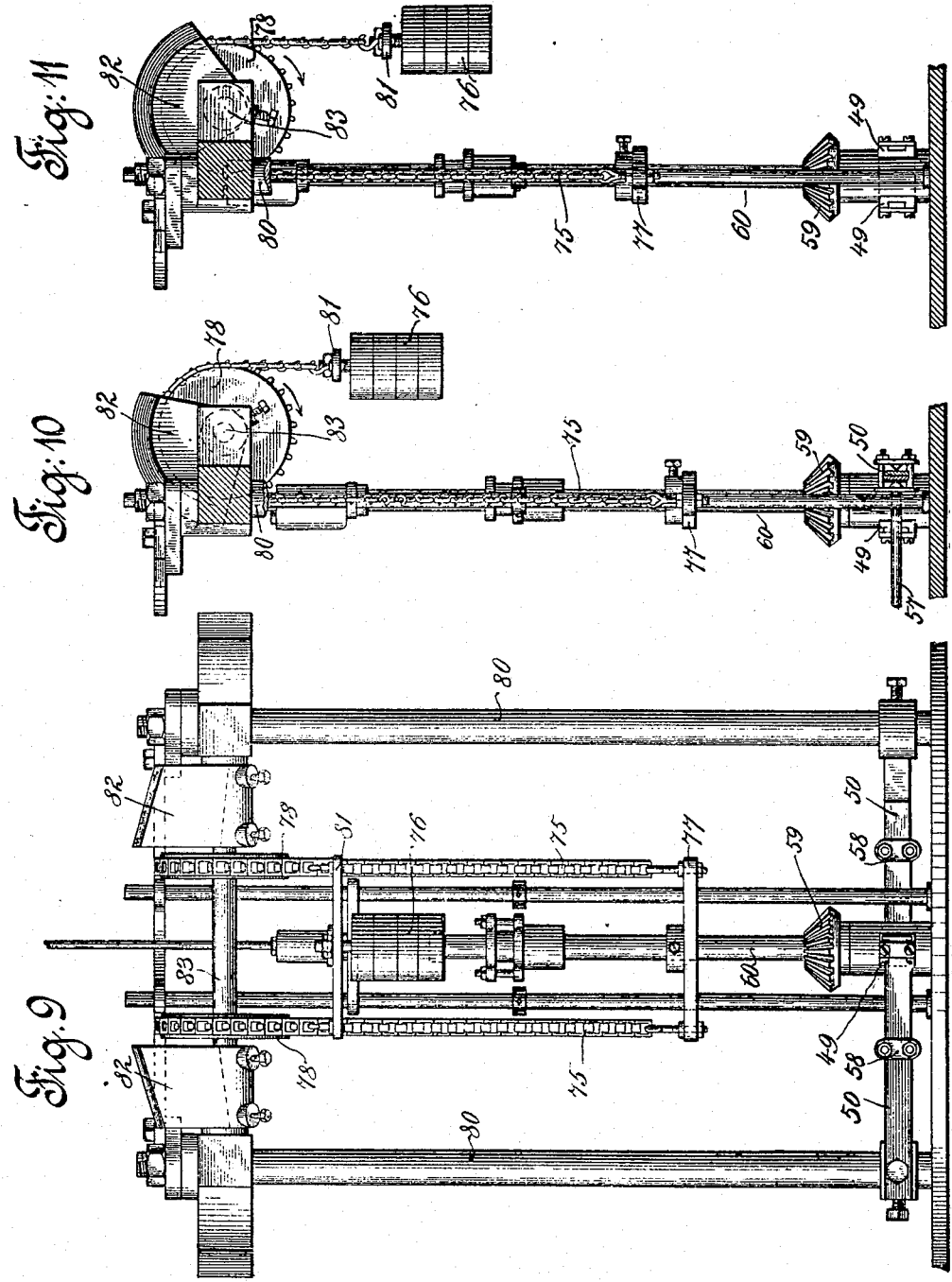
WITNESSES:
F. N. Rochrich
John Prager
INVENTOR
Seraphin Kribs.
BY his ATTORNEYS
Kenyon & Kenyon No. 835,245. PATENTED NOV. 6, 1906.
S. KRIBS.
PRESS FOR MAKING GLASS INSULATORS OR SIMILAR GLASS ARTICLES.
APPLICATION FILED AUG. 10, 1905.
9 SHEETS—SHEET 9.
Fig: 12
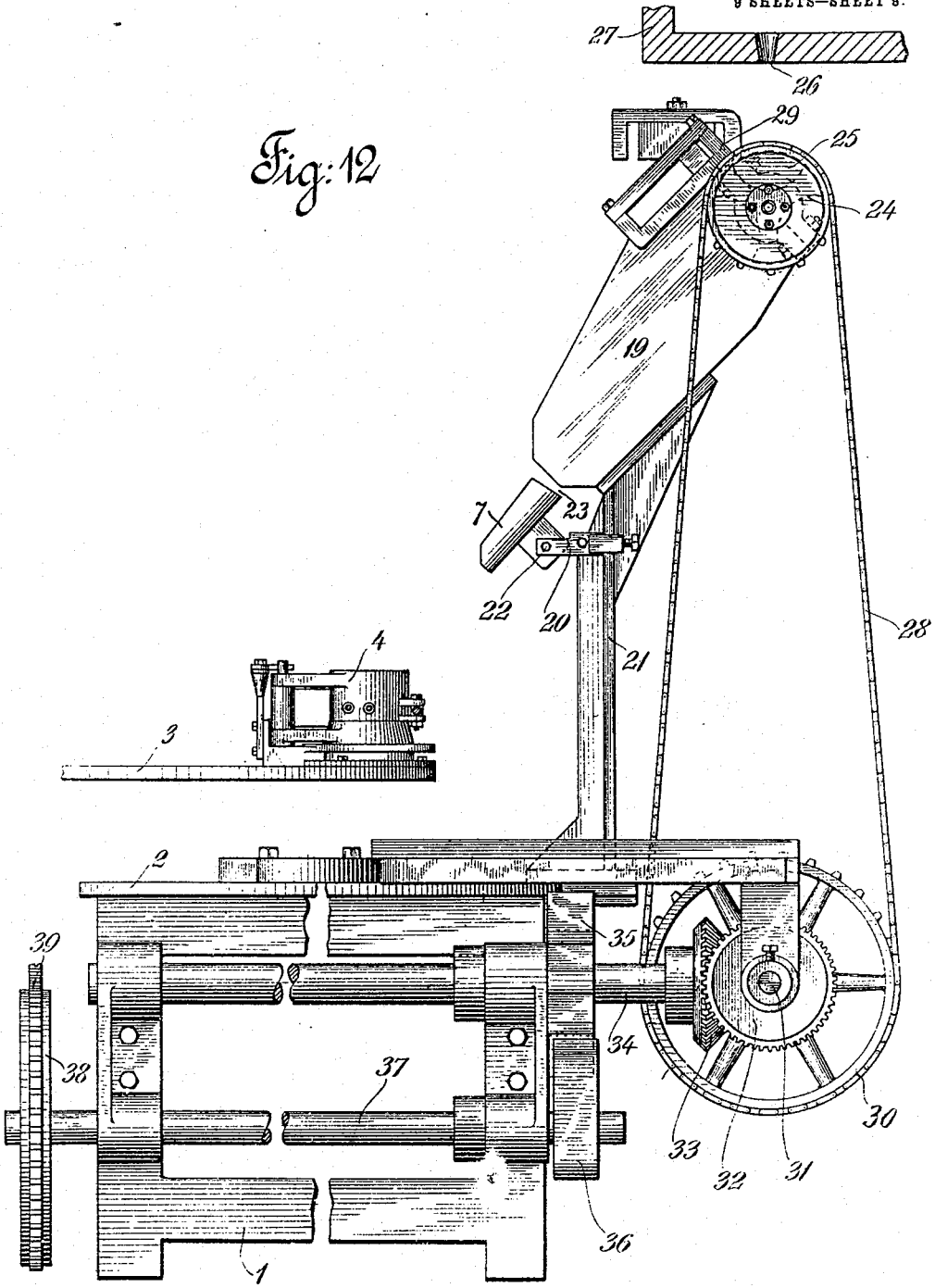
WITNESSES:
F. N. Roehrich
John Prager
INVENTOR
Seraphin Kribs
BY his ATTORNEYS
Kenyon & Kenyon

UNITED STATES PATENT OFFICE.

SERAPHIN KRIBS, OF BROOKLYN, NEW YORK, ASSIGNOR TO HENRY M. BROOKFIELD, OF NEW YORK, N. Y.

PRESS FOR MAKING GLASS INSULATORS OR SIMILAR GLASS ARTICLES.

No. 835,245.  Specification of Letters Patent.  Patented Nov. 6, 1906.

Application filed August 10, 1905. Serial No. 273,514.

*To all whom it may concern:*

Be it known that I, SERAPHIN KRIBS, a citizen of the United States, and a resident of Brooklyn, in the county of Kings and State of New York, have invented certain new and useful Improvements in Presses for Making Glass Insulators or Similar Glass Articles, of which the following is a specification.

My invention relates to presses for making glass insulators or other similar glass articles. It is of especial value with automatic presses, although in some of its features it can be used with presses other than automatic ones.

It has for its object to improve the apparatus of such presses, to increase its speed, to render the finished insulators or other articles more perfect, especially to make and keep the interior screw-threads of such insulators more true and perfect and less liable to distortion, and also generally to improve the structure of such presses, to make its operation more rapid and certain, and to improve the finished article.

My invention consists in the novel devices herein shown and claimed.

In the drawings accompanying this specification and forming a part hereof I have shown my improvement in connection with a press entirely automatic, although, as above stated, some features of my invention can be used in other kinds of presses. They are of chief value, however, in connection with automatic presses for making insulators.

Figure 2:
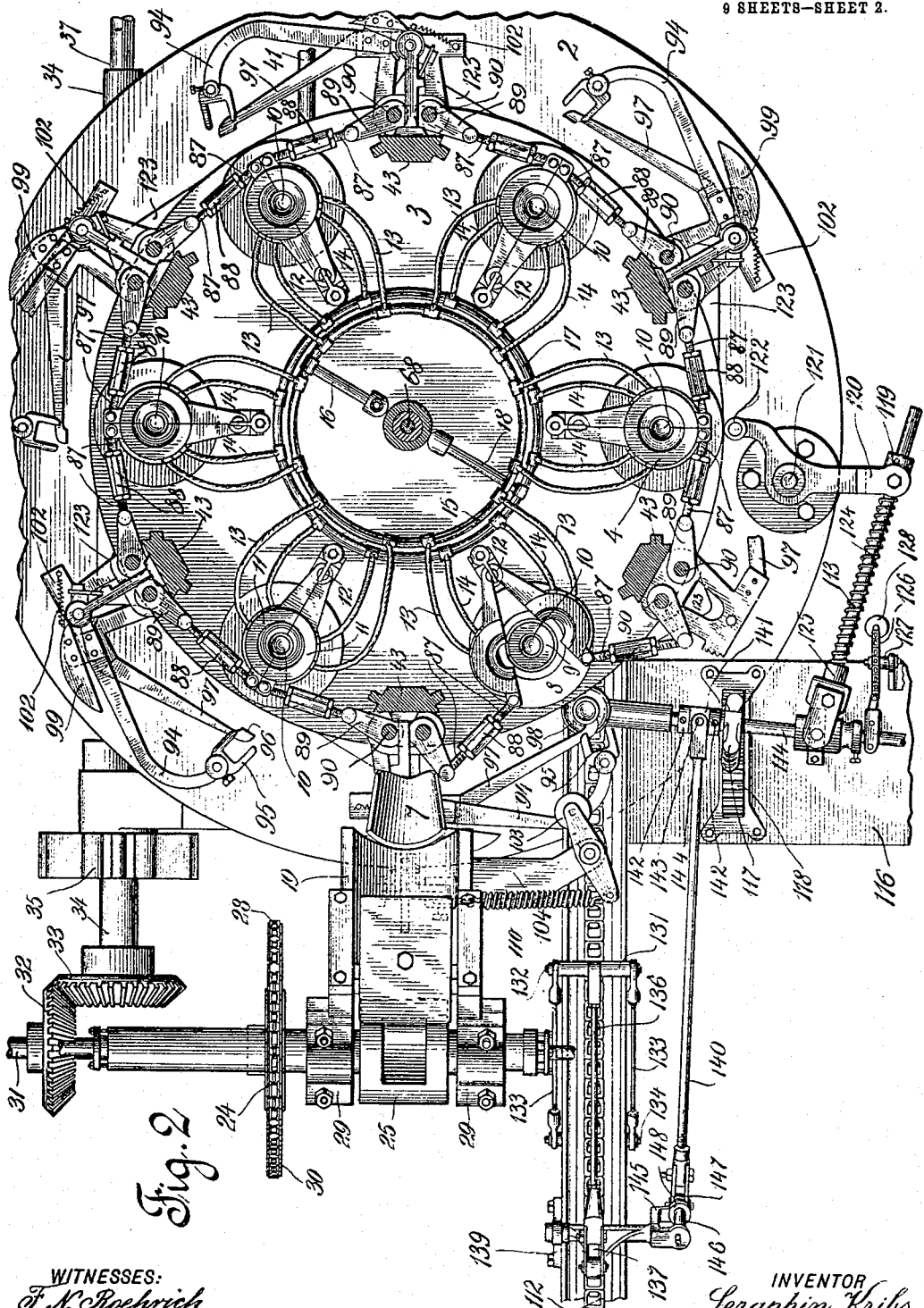
Figure 3:
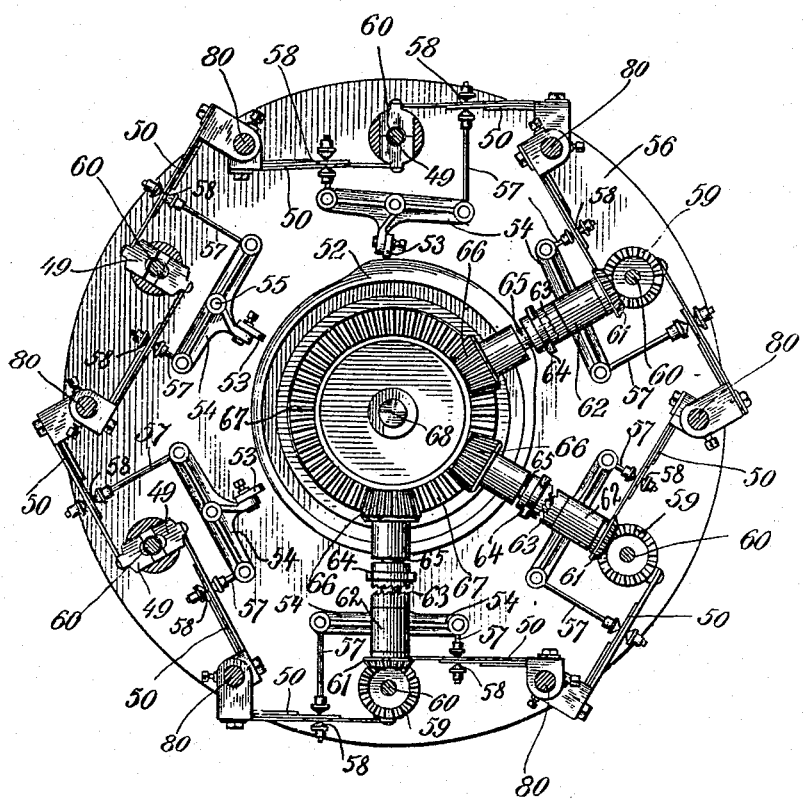
Figure 4:
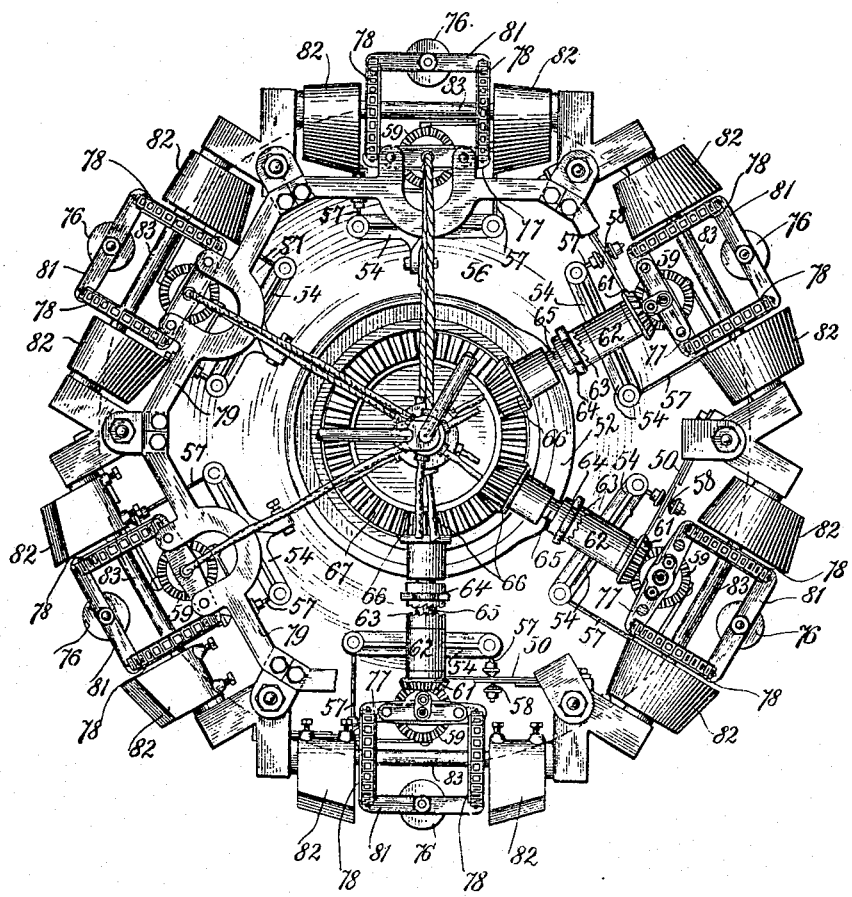
Figure 5:
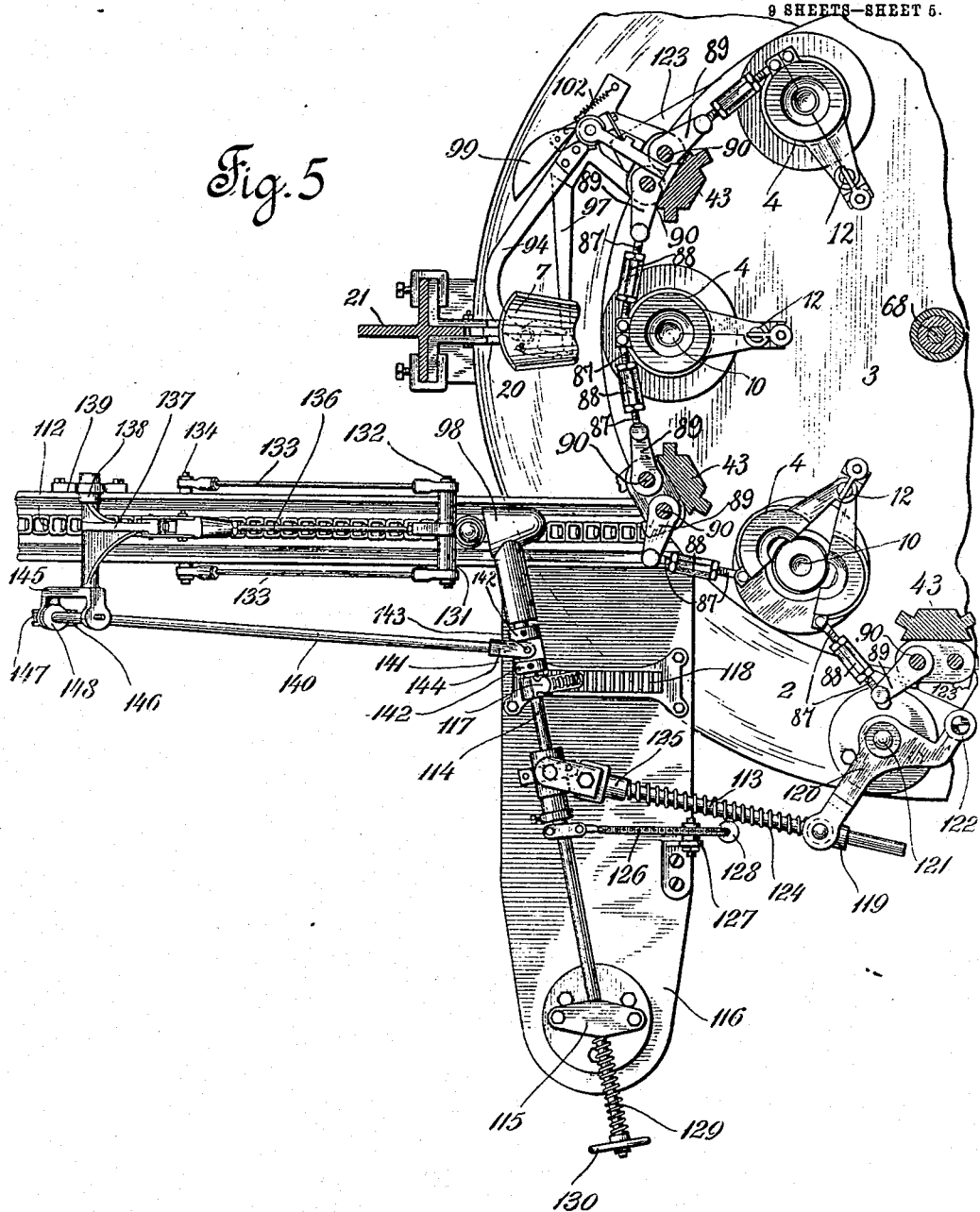

Referring to the specific form of press shown in the drawings, Figure 1 is a side elevation, certain parts of the machine being omitted for the sake of clearness. Fig. 2 is a horizontal section on the line 2 2 of Fig. 1. Fig. 3 is a horizontal section on the line 3 3. Fig. 4 is a plan view of the machine, illustrating the weight apparatus. Fig. 5 is a detailed plan of the devices for preventing the overthrow of the insulator. Fig. 6 is a side elevation of the same apparatus. Figs. 7 and 8 are details of part of the same mechanism. Figs. 9, 10, and 11 are detailed views of the weight mechanism, and Fig. 12 is a detailed view of the adjustable chute shown as connected with the main chute and operating mechanism.

The press shown in the drawings is entirely automatic.

1 is a stationary frame supporting the other parts of the press, carrying a stationary table 2.

3 is a rotary turn-table upon which are mounted the molds 4. As shown in Fig. 2, six molds are provided, although of course the number of molds may be varied to suit the particular circumstances.

5 is a screw-plunger, and 6 the follower and former, which are here shown in one piece.

In the form shown in the drawings the rotary table 3 with its molds and the other parts carried by it are rotated continuously, although, if desired, this motion could be made intermittent.

The general mode of operating the press shown is as follows: The glass is inserted by means of a chute 7. The means for feeding it automatically to the chute will be presently described. It will be understood that the glass is fed in and the other operations take place during the continuous rotation of the table in the form shown in the drawings. Immediately after the glass is poured into the mold the screw-plunger and follower are forced into the molten glass. This movement is accomplished automatically by cams, as will be presently described. Very soon thereafter the follower and former are moved up out of contact with the molten glass in the mold, the screw remaining in longer until the insulator is properly set. This is also accomplished by a cam. Then the screw-plunger is screwed out of the glass in the mold and is further raised by a weight. The devices for accomplishing these two steps will be subsequently described. The next operation is to open the two upper movable parts of the mold. This operation is also performed by cams. The open position of the mold is indicated at 8. As soon as the mold begins to open a fork is automatically moved inward, grasping the insulator in one of the circular grooves near the top portion of the insulator, and as soon as the mold is fully opened the fork is raised, lifting the insulator upward from the mold. Then the fork is swung outward and the insulator disengaged from it. The insulator falls into a cup prepared for it, and this cup turns it over, so that the petticoats will be downward, placing it upon an endless chain running into the leer. I provide means for preventing the overthrowing of the insulator as it is turned over and placed upon the endless chain.

The various devices of the press shown in the drawings will now be described in the order in which the above operations take place.

As shown, the molds employed in my press consist each of a solid lower part 9, provided, of course, with a hollow cup-shaped interior 10, adapted to form the head of the insulator, and of two movable upper portions 11 11, pivoted together on a pin 12. The means for opening and closing these parts of the mold will be presently described.

13 is an inlet-pipe, and 14 an outlet-pipe, for each mold to provide a circulation of some cooling medium. 13 is connected with a central supply-pipe 15, which receives the cooling medium through pipe 16 from any suitable outside source. Each pipe 14 is connected with a central pipe 17, connected with a discharge-pipe 18.

The means for automatically feeding the molten glass into the molds are especially illustrated in Figs. 1, 2, and 12. 19 is a chute which receives the glass from the separating and measuring devices and discharges the molten glass into the chute 7, from whence it is directed so that it falls into the mold. Chute 7 is preferably adjustably mounted upon an arm 20, secured to bracket 21, secured to the stationary table 2. Chute 7 is made adjustable on arm 20 by a bolt 22. The object of making the chute adjustable is to enable the direction of the throw of the molten glass to be varied somewhat, so as to accommodate different sizes of molds. A small opening 23 is preferably left between chute 7 and chute 19. The object of leaving this small opening is to permit water, oil, and other refuse to drop in between the two chutes, and thus prevent them from falling into the mold with the molten glass, where they might do serious damage. This opening, however, is so small that the molten glass slides over it and does not drip down through it. As far as the molten glass is concerned the two chutes are the same as if practically continuous. If desired, they could be so made. In practice I have found this opening of great value.

My improved chute 7 has the additional advantages that only one chute is required for the press, and it is situated at a place where it is not in the way at all, whereas in automatic presses for making insulators and similar articles there have been employed heretofore a large number of chutes, and these have been secured to the rotary turntable, one at each mold. In this position the chutes are very much in the way of the different operations. Moreover, it is exceedingly difficult to keep the chutes of the proper temperature, because after a supply of molten metal has passed over one of them into its mold no further molten glass comes into contact with the chute until the table has made a complete revolution. This permits the chute to cool too much, so that when the next batch of molten glass passes over it it unduly cools the molten glass, rendering it more unfit for being molded into an insulator. With my improved chute arranged and located as shown neither of these troubles is present. The chute is out of the way, and as the batches of molten glass are constantly passing over it it is easily maintained at the proper temperature and does not injuriously cool the glass. As a result the finished insulators are more perfect.

The means for automatically feeding the batches of glass to the chutes 19 and 7 form no part of this invention and are not shown in full detail, but merely in outline, and will be briefly described as such.

24 is a wheel provided with three different surfaces 25 for receiving the molten glass as it flows from orifice 26 of glass-furnace 27. This wheel is intermittently rotated by means of a chain 28, and this motion is timed by mechanism presently to be described, so that each cup-shape 25 will receive just the exact amount of molten glass required and will be rotated past scraper 29 and delivers its batch of molten glass into chute 19, whence it passes through chute 7 to mold 4 in the press. Wheel 24 is driven and timed in its movements by the following mechanism: Chain 28 is driven by sprocket-wheel 30 on shaft 31 and beveled gears 32 on shaft 31 and 33 on shaft 34. 35 is a star-wheel fast on shaft 34, and it is intermittently rotated by a single tooth 36 on a shaft 37, driven by a sprocket-wheel 38, fast on the shaft, and a chain 39, running over a sprocket-wheel 40 on the main driving shaft 41 of the machine. Immediately after the molten glass has been fed into the mold the screw-plunger, follower, and former are lowered into or in connection with the molten glass in the mold.

Heretofore when screw-plungers have been depressed into the molten glass in presses for making glass insulators or similar articles it has been customary to attach a weight to the shaft of the screw-plunger in order to raise the screw-plunger upward after it has been screwed out of the insulator. In all such constructions the weight is operative necessarily while the screw-plunger is still in the molten glass and after the follower and former have been raised. This tends to pull the screw upward against the threads made in the molten glass while the glass composing such threads is still soft. This tends to distort the screw-thread of the finished insulator. This is a serious objection and leads to a considerable loss of insulators. Such distorted insulators cannot be made to fit the wooden pins which are employed in practice to support them. In my improved devices I provide means whereby the weight employed to raise the screw-plunger after it has been screwed out of the glass is not operative while the screw-plunger is within the glass of the insulator, but becomes operative as a weight tending to lift the screw-plunger only, after the screw-plunger has been screwed out of the insulator. For this reason I am enabled to make insulators with much more perfect interior screw-threads than has heretofore been possible, and the loss occasioned by the distortion of screw-threads produced heretofore in the manner described is not present in insulators made upon my improved devices.

I will now proceed to describe the means for raising and lowering the screw-plunger and follower and former and in connection with them my improved devices in connection with the weight above referred to.

Both the screw-plunger 5 and the follower and former 6 are moved downward by frame 42, moving in vertical supports 43. Frame 42 is forced downward by a cam-track 44, which is dipped downward in the usual way at the point where the plunger and follower and former are to be moved downward into the mold. This point is indicated at 45. Roller 46, secured to the frame, rides on top of cam-track 44. 47 47 are two studs fast to the frame, passing through holes on the upper part of the follower and former. Springs 48 encircle studs 47 and normally tend to press the follower and former downward. They are merely for the purpose of permitting the follower and former to yield in the usual way. When frame 42 moves downward, it forces the follower and former downward through springs 48 and also forces screw-plunger 5 downward by means of the frame striking a shoulder (not shown) on the shaft of screw-plunger 5. Shortly after the screw-plunger and the follower and former have been pressed downward the follower and former are lifted upward by the raising of frame 42, through roller 46 riding up on cam-track 44, to their normal positions. The screw is of course permitted to remain in the glass the proper length of time to set the screw-thread. It is then raised by means of a two-part nut 49, each part of which is mounted on a spring-arm 50. These nuts are normally separated, but are brought together when it is desired to screw screw-plunger 5 out of the insulator. It is during the time that the screw-plunger remains in the molten glass in the mold after the follower and former have been raised and until the screw-plunger has been screwed out of the glass that the danger referred to above exists. During that time by my improvement the weight for lifting the screw-plunger farther up to its original position is made inoperative and is then brought into operation. During this time and while the screw-plunger is in the molten glass in the insulator there is no upward pull upon the screw-plunger, except that in the unscrewing operation there is the necessary lifting due to the unscrewing operation, which, however, has no tendency whatever to distort the screw-threads, as the screw-thread is guided and controlled and held by the screws in the nut, which are made of the same pitch as those of the screw-plunger itself.

I will now proceed to describe the devices for screwing out the screw-plunger and for making the weight inoperative during the time above stated and of bringing it into operative position at the proper moment. This is especially illustrated in Figs. 1, 3, 4, 9, 10, and 11. Spring-arms 50, upon which the half-nuts 49 are mounted, normally tend, through their spring action, to keep the two half-nuts separated, as shown, for example, at point 51 in Fig. 3. This is the position of the parts of the nut when the screw-plunger is forced downward into the glass and at all times except during the unscrewing operation. The parts of the nut are closed together by means of a stationary cam 52, secured to the framework of the press, and a projecting arm 53 from a rock-lever 54, pivoted at 55 to a ring 56, supported on uprights 43, and revolving with rotary table 3. Each arm of rock-lever 54 carries two rods 57 57, each provided at its end with two finger-points 58 58, loosely pressing upon each side of spring 50. As projecting arm 53 is forced up on the raised part of cam 52 the rods 57 57 are moved, so as to force spring-arms 50 50 toward each other, closing the two parts of the nut upon the screw-threaded shaft of plunger 5. It will of course be understood that this part of the shaft of plunger 5 is screw-threaded in exactly the same way as the plunger 5, the pitch of both parts being exactly the same, so that when plunger 5 is withdrawn from the glass in the mold it will not distort the screw-threads formed in the glass of the mold. In this condition of the parts plunger 5 is rotated, 49 49 thereby raising the screw-plunger upward. This is accomplished by means of a beveled gear 59, fast on a shaft 60 of each screw-plunger 5, meshing with a beveled gear 61, mounted on one end of sleeve 62, the other end of the sleeve carrying one part, 63, of the clutch, the other part, 64, being movable longitudinally on a shaft 65, so as to engage with or be disengaged from the other part of the clutch, but keyed to the shaft in the usual way. Shaft 65 carries at its inner end a beveled gear 66. The gears 66 mesh with a single central beveled gear 67, fast on shaft 68. This shaft is driven by beveled gears 69 and 70, the latter fast on shaft 71, which is driven through a sprocket-wheel 72 and a chain 73, running over a sprocket-wheel 74 and main driving-shaft 41.

The means for operating the clutch—that is, for moving the movable part 64—form no part of my invention and are not shown in gage a curved cam-surface 92, secured to frame 42. It will be understood, of course, that each half-mold is similarly connected to one side of one of the frames 42. The cams 92 are made operative by the lifting of frame 42 at the proper time. This lifting is caused by roller 46 riding up on still another raised portion 93 of cam-track 44. This operation is performed shortly before the point marked 8 on Fig. 2 is reached by a mold.

The next operation is the lifting of the insulator out of the lower solid part of the mold. The devices shown for this purpose consist of a swinging arm 94, provided with a fork 95. This arm swings inward as the mold begins to open, so that the fork encircles the insulator in the groove near the upper part of the insulator. The arm is then raised vertically, lifting with it the insulator until the latter is clear of the mold. The arm is then swung outward in its raised position. As it passes outward the lower part of the insulator strikes the curved surface 96 at the end of a stationary arm 97, which forces the insulator out from the fork. The insulator then drops into a cup 98, suitably placed to receive it.

The devices for moving the swinging arm 94 are especially shown in Figs. 1, 2, and 5. Arm 94 is swung inward by means of a cam-shaped arm 99, fastened to a sleeve 100, which carries swinging arm 94. Sleeve 100 turns on a stationary stud 101, fastened to upright standard 43 on a rotary table. A spring 102 normally holds sleeve 100, so that arm 94 is in its outward position. As the rotary table rotates, cam 99 comes into contact with a roller 103, secured to the stationary table 2 by means of a bracket 104. There is only one roller 103, and with this the different cams 99 come into contact at the proper time. The action of roller 103 on cam 99 causes sleeve 100 to rotate, swinging arm 94 inward until fork 95 embraces the insulator. Sleeve 100 and arm 94 are raised upward by means of a sleeve 105, loose on stud 101, upon which sleeve 100 rests. Lower sleeve 105 is raised at the proper time by means of two links 106, pivoted one at each side of the sleeve, the links being pivotally connected to two links 107, pivoted to the framework of the rotary table. Links 106 and 107 at their junction carry a roller 108. 109 is a cam upon which roller 108 rides when the proper point is reached. There is one cam 109, and it is carried by bracket 104. When roller 108 strikes cam 109, the roller rides up on it and lifts links 106 and 107, sleeve 105, sleeve 100, and swinging arm 94. This raises the insulator high enough so that arm 94 in swinging outward will cause the insulator to clear the mold. A spring 110, connected with the roller 103, permits the roller to give in case arm 94 is blocked and cannot move inward, and spring 111 permits cam 109 to give in a similar way should roller 108 or its connecting parts be blocked and be unable to move. In both of these cases in the instances cited some part of the machine would break unless the said roller and cam were permitted to yield if required to do so. Spring 102 moves swinging arm 94 outward with the insulator whenever cam-arm 99 and roller 103 permit the movement. In practice the motion will not be a sudden one, as otherwise the insulator might be thrown out of the fork. Toward the close of this outward movement a stationary arm 97 forces the insulator out from fork 95, whereupon the insulator drops into cup 98, as already described. Cup 98 is for the purpose of turning the insulator over so that it will fall upon an endless chain 112, which carries it to and through the leer. The leer is not shown in the drawings, as it forms no part of the invention. If the insulator fell with its rounded head onto the chain, it would roll onto the side and would remain in this position during the annealing operation. This is objectionable, as the insulator is somewhat soft in this condition, and the glass would settle downward somewhat through its own weight, tending to make the cross-section of the interior screw-thread depart from the true circular form. This is a serious objection in practice, as many insulators would have their screw-threads so distorted that they cannot be screwed upon the wooden screw-pins intended to support them. By turning the insulator over so that it will stand upon the endless chain upon the petticoat portion the insulator will stand in that position during the annealing operation, and the axis of the interior screw portion will be in a vertical position, so that there will be no tendency to depart from the true circular cross-sectional form. Any settling of the glass will be substantially at right angles to the line of the screw-thread, and in practice this leads to no objectionable result.

The devices shown for upsetting the cup 98 are as follows: They are particularly illustrated in Figs. 1, 2, 5, and 6. In Figs. 2 and 6 the cup is shown in its vertical position, the position in which the insulator is dropped into it, and Fig. 5 shows the cup turned a quarter-revolution, just having thrown out the insulator upon the endless chain. It is found in practice that a quarter-turn is sufficient for the purposge. Cup 98 also has a swinging horizontal movement in order to carry the insulator from the position in which it is received to a position directly over the endless chain. Both of these movements take place together. The swinging or sidewise movement is caused by means of a rod 113, pivoted to a rod 114, which supports the cup 98. A rod 114 is supported toward one end in bearings 115, carried by a stationary bracket 116, projecting from the stationary table 2. It is connected with bearing 115 by means of a swivel-joint. At its inner end rod 114 is supported by a toothed segment 117, secured to rod 114 and gearing with a stationary rack 118 on bracket 116. Rod 113 passes through a sleeve 119, pivoted or swiveled to a bell-crank lever 120, pivoted at 121 in a stationary table 2 and carrying at its inner end a roller 122, adapted to engage with cams 123, one for each mold, mounted on the rotary turn-table 3. When roller 122 engages cam 123, it forces rod 113 and cup 98 to swing outward. The motion of the bell-crank 121 and rod 113 is communicated through a spring 124, encircling rod 113 between the end of the bell-crank and a shoulder 125 on the rod. Rod 114 and cup 98 are brought back to their normal inward position by means of a chain 126 running over a pulley 127 and at its lower end carrying a weight 128. Rod 114 is slidingly pivoted to bearing 115, passing through a sleeve forming part of that bearing. A spring 129, encircling rod 114 between the bearing and a shoulder on the rod, holds rod 114 in its normal position, but permits it to give longitudinally should there be any blocking. This giving is to prevent a breaking of any of the parts should a block occur. 130 is a hand-wheel mounted on rod 114 to permit a manual upsetting of cup 98 should that be desired. The turning movement of cup 98 to throw the insulator out of it is imparted to it by toothed segment 117 running over and engaging with rack 118. I find in practice that a quarter-revolution of the cup is sufficient for the purpose. This throws the insulator out of the cup on the chain, bringing it with the petticoats downward. In practice it has been found that this movement is apt to overthrow the insulators and cause them to topple over and fall upon their side. Where this occurs, the insulator will pass through the leer upon its side, and the screw-thread will be distorted, as already described. By my improved devices this overthrowing is prevented. The specific means shown in the drawings for this purpose I will now describe. They are especially illustrated in Figs. 2, 5, 6, 7, and 8. In order to prevent the overthrowing of the insulator, I preferably cause a stop to be inserted at the proper moment, against which the head of the insulator will strike if it passes the vertical line and tends to topple over. In the form shown in the drawings 131 constitutes this stop. It is only momentarily brought into operative stopping position and is immediately removed after its work is done, as otherwise it would prevent the inward movement of the insulator and would tend to topple it the other way. The form of this stop may be varied to suit the circumstances, and any suitable means may be employed for operating it. Those shown in the drawings consist of the following: The stop 131, as shown, is a sleeve loosely mounted on pin 132. This pin is carried by two swinging arms 133, pivoted at 134 to a bracket 135, dependent from the stationary table 2. Fast to the sleeve 131 is a rod 136, pivoted at its other end to a lever 137, the latter fulcrumed at 138 in a bracket 139 on table 2. Secured to lever 137 at its lower end is a rod 140. This rod at its other end, by means of a square bearing 141, encircles rod 114. The square bearing 141 is kept in its proper place in shaft 114 by means of two collars 142 142, placed on each side of it. These collars are fixed to the shaft 114 by means of set-screws. The square bearing 141 is provided on its top and bottom sides with pivot-pins 143 143. Rod 140 is provided on the end nearest to rod 114 with a fork 144, which fits over the square bearing and is kept on it by the two pivot-pins 143 in such a manner as to allow rod 140 a free horizontal movement on the pins 143. The square bearing 141 being prevented from sliding longitudinally on the rod 114 permits the rod 114 to freely rotate in it and at the same time allows the rod 140 a free vertical movement at its other end. In effect it is a universal joint. The joint between rod 140 and lever 137 is also substantially a universal joint. In detail it consists of a forked-shaped bracket 145, projecting out from the lower end of the lever 137 and having the two projecting ends of the fork 145 form pivots for a short shaft 146. The lower end of that short shaft 146 projects through the lower projection of the fork-shaped bracket 145 and has at its lower end an eye-shaped extension 147, forming a pivotal point for one end of the rod 140. The rod 140 is pivoted at 147 by means of a pin. The shaft 146 is prevented from sliding out of its bearing in the fork-shaped bracket 145 by means of a collar 148. This construction allows the rod 140 to move both ways, either vertically or horizontally, in order to provide for the movement necessitated by its connection with rod 114. These parts are so proportioned, and the movements so timed that stop 131 will be moved downward and to the right as viewed in Fig. 7, describing the arc of a circle, and the stop 131 will be brought opposite the top of the head of the insulator just as it is thrown out of cup 98 and is in the position shown in Fig. 5. If the insulator tends to overthrow, its head will strike stop 131, and it will be held in an upright position. Immediately thereafter stop 131 begins to rise and move to the left, and this movement is timed so that it will move to the left as rapidly as the insulator is moving on the chain and will rise above the top of the insulator in time for the insulator to continue its movement on the chain. Before my stop device was used a large proportion of the insulators attempted to be placed upon the chain by the cup were overthrown and lay upon their sides and were liable to the distortion of the screw-threads already described. By the use of my improved devices this is entirely prevented.

It will be understood, of course, that the movement of stop 131 and its connecting parts are caused by the swinging movement of rod 114.

My improved device for upsetting insulators and other articles and preventing their overthrow is chiefly of value in connection with placing such articles upon a conveyer to carry them to and through the leer, in which latter place lies the chief danger from their lying on their sides; but my improvement in this respect is not limited to use on a conveyer or with such a conveyer. It is also sufficient for my invention if the stop for preventing overthrow and the insulator be brought into contact with each other at the critical moment in any suitable way. Where my improved stop moves, I preferably move it when moving away from the insulator in the line of movement of the conveyer where one is employed, although it is not limited to such a construction.

Any other suitable means than those shown in the drawings may be employed for rendering operative or inoperative the weight employed to lift the screw-plunger after it has been disengaged from the screw-threads in the insulator.

My invention in general is not limited, of course, to the device shown in the drawings, as many departures therefrom and modifications therein or changes or additions may be made without departing from my invention.

What I claim as new, and desire to secure by Letters Patent, is—

1. In an automatic press for making glass insulators or similar molded glass articles, the combination of a rotary turn-table, a plurality of molds mounted and carried thereon, each mold having a single solid lower part and two pivoted movable upper parts, a stationary adjustable chute, provided with an opening over which the molten glass will pass but through which oil, water and other refuse will drop, for feeding the batches of molten glass successively to the different molds, means for automatically feeding the batches of molten glass to the chute, means for automatically forming the articles in the molds, a weight for raising the screw-plunger to its normal raised position inoperative when the screw-plunger is in contact with the molten glass in the mold but operative as soon as the screw-plunger leaves the glass, means for automatically opening the mold, means for automatically raising the article therefrom and swinging it outward over a receiving device, means for turning over the said receiving device to upset the article upon a conveyer adapted to convey the article to and through the leer so that the article will stand upon the conveyer with its petticoat or wider part downward, and a stop for preventing the overthrowing of such article as it upsets, adapted to be momentarily moved into position over the conveyer for that purpose and to be immediately withdrawn so as not to interfere with the movement of the article on the conveyer.

2. The combination of a screw-plunger for forming the screw-threads of insulators or similar articles, and a weight connected therewith, means for rendering the weight inoperative to exert an upward pull upon said screw-plunger while the latter is in the molten glass in a mold and for rendering it operative, when the screw-plunger has been screwed out of the glass in the mold, to exert an upward pull upon the screw-plunger to raise it to its normal raised position.

3. The combination of a screw-plunger for forming the screw-threads of insulators or similar articles, and a weight connected therewith for raising the screw-plunger, means for moving the weight into a position where it will be inoperative to raise the screw-plunger, while the latter is in the molten glass in a mold, and for moving it, when the screw-plunger is freed from the said glass, into a position where it will become operative to raise the screw-plunger, whereby no upward pull will be exerted upon the screw-plunger while in the molten glass in the mold, but an upward pull will be exerted upon it when it is freed from the screw-threads formed in the molded article.

4. The combination of a screw-plunger for forming the screw-threads of insulators or similar articles, a weight pivoted below its center of gravity and connected with the screw-plunger for raising it to its normal raised position, and means for throwing it to one side of its pivot against a stop, while the screw-plunger is in the molten glass in the mold, to render it inoperative, and for throwing it to the other side of the pivot, when the screw-plunger is freed from the screw-threads of the molded article, to render it operative to raise the screw-plunger, whereby no upward pull will be exerted upon the screw-plunger while in the molten glass in the mold, but an upward pull will be exerted upon it when it is freed from the screw-threads formed in the molded article.

5. The combination of a screw-plunger for forming the screw-threads of insulators or similar articles, a flexible connection passing over a pulley secured at one end to the screw-plunger shaft, a counterbalancing-weight secured to the other end of the flexible connection, a weight pivoted below its center of gravity to the pulley-axis and movable with the said connection, means for moving the screw-plunger down into molten glass in a mold and moving the pivoted weight to one side of its pivot and causing the two weights and the flexible connection to counterbalance one another while the screw-plunger is in such position, and means for unscrewing the screw-plunger from the threads formed in the molded article, and means for moving the pivoted weight to the other side of its pivot, and the flexible connection part way over the pulley, whereby no upward pull will be exerted upon the screw-plunger while in the molten glass in the mold, but an upward pull increasing in strength will be exerted upon it when it is freed from the screw-threads formed in the molded article.

6. The combination of a device for upsetting glass insulators or other similar glass articles to cause them to turn over and land upon a receiving-surface with their petticoat or wider portion downward, and a stop to prevent them from overthrowing, whereby the falling over of such articles upon their side upon the receiving-surface will be prevented.

7. The combination of a movable conveyer for carrying glass insulators or similar molded glass articles, a device for upsetting the articles to cause them to turn over and land upon the conveyer with their petticoat or wider portion downward, and a stop to prevent them from overthrowing, whereby the falling over of such articles upon their side upon the conveyer will be prevented.

8. The combination of a movable conveyer for carrying glass insulators or similar molded glass articles to and through the leer, a device for upsetting the articles to cause them to turn over and land upon the conveyer with their petticoat or wider portion downward, a movable stop to prevent them from overthrowing, means for moving the stop to bring it momentarily into position to engage the article in case it should overthrow as it is upset, to prevent such overthrowing, and means for moving it out of such position in time so as not to interfere with the movement of the article on the conveyer, whereby the falling over of such articles upon their side upon the conveyer will be prevented.

9. The combination of a movable conveyer for carrying glass insulators or similar molded glass articles to and through the leer, a device for upsetting the articles to cause them to turn over and land upon the conveyer with their petticoat or wider portion downward, a movable stop to prevent them from overthrowing, means for moving the stop to bring it momentarily into position to engage the article in case it should overthrow as it is upset, to prevent such overthrowing, and means for moving it in the same general direction as the line of movement of the conveyer out of such position in time so as not to interfere with the movement of the article on the conveyer, whereby the falling over of such articles upon their side upon the conveyer will be prevented.

10. The combination of molding apparatus and a chute adapted to receive batches of molten glass for making insulators or similar articles, and to direct them into such molding apparatus, provided with an opening over which the molten glass will pass to the molding apparatus, but through which will drip or fall water, oil or other foreign substances associated with the molten glass.

11. The combination of molding apparatus and a chute adapted to receive batches of molten glass for making insulators or similar articles, and to direct them into such molding apparatus, provided with a small opening over which the molten glass will pass to the molding apparatus, but through which will drip or fall water, oil or other foreign substances associated with the molten glass.

12. The combination of a press for making glass insulators or similar articles, provided with a rotary turn-table having thereon a plurality of molds, and a chute adapted to receive the batches of molten glass and direct them successively into the different molds of the press as they pass the chute in turn, provided with an opening over which the molten glass will pass to the molds, but through which will drip or fall water, oil or other foreign substances associated with the molten glass.

In testimony whereof I have signed my name to this specification in the presence of two subscribing witnesses.

SERAPHIN KRIBS.

Witnesses:
FRANK N. ROEHRICH,
DE FOREST JETMORE.